US011222627B1

(12) United States Patent
Qian et al.

(10) Patent No.: US 11,222,627 B1
(45) Date of Patent: Jan. 11, 2022

(54) EXPLORING ASR-FREE END-TO-END MODELING TO IMPROVE SPOKEN LANGUAGE UNDERSTANDING IN A CLOUD-BASED DIALOG SYSTEM

(71) Applicant: Educational Testing Service, Princeton, NJ (US)

(72) Inventors: Yao Qian, Dublin, CA (US); Rutuja Ubale, Union City, CA (US); Vikram Ramanarayanan, San Francisco, CA (US); Patrick Lange, San Francisco, CA (US); David Suendermann-Oeft, San Francisco, CA (US); Keelan Evanini, Pennington, NJ (US); Eugene Tsuprun, Hillsborough, NJ (US)

(73) Assignee: Educational Testing Service, Princeton, NJ (US)

( * ) Notice: Subject to any disclaimer, the term of this patent is extended or adjusted under 35 U.S.C. 154(b) by 107 days.

(21) Appl. No.: 16/197,704

(22) Filed: Nov. 21, 2018

Related U.S. Application Data

(60) Provisional application No. 62/589,961, filed on Nov. 22, 2017.

(51) Int. Cl.
| | |
|---|---|
| *G10L 15/16* | (2006.01) |
| *G10L 15/18* | (2013.01) |
| *G10L 15/22* | (2006.01) |
| *G10L 15/24* | (2013.01) |
| *G10L 25/24* | (2013.01) |

(52) U.S. Cl.
CPC .......... *G10L 15/1815* (2013.01); *G10L 15/16* (2013.01); *G10L 15/22* (2013.01); *G10L 25/24* (2013.01)

(58) Field of Classification Search
CPC ..... G10L 15/1815; G10L 15/22; G10L 15/16; G10L 15/265; G10L 25/24; G09B 19/06
USPC .......................... 704/232, 257, 270; 434/185
See application file for complete search history.

(56) References Cited

U.S. PATENT DOCUMENTS 10,332,508 B1 * 6/2019 Hoffmeister ........... G06N 20/10
10,586,531 B2 * 3/2020 van den Oord ...... G06N 3/0454
(Continued)

OTHER PUBLICATIONS

Castan, Diego, et al. "Broadcast news segmentation with factor analysis system." First Workshop on Speech, Language and Audio in Multimedia. Aug. 2013, pp. 20-25. (Year: 2013).*

(Continued)

*Primary Examiner* — Daniel C Washburn
*Assistant Examiner* — Oluwadamilola M Ogunbiyi
(74) *Attorney, Agent, or Firm* — Jones Day

(57) ABSTRACT

Systems and methods are provided for conducting a simulated conversation with a language learner include determining a first dialog state of the simulated conversation. First audio data corresponding to simulated speech based on the dialog state is transmitted. Second audio data corresponding to a variable length utterance spoken in response to the simulated speech is received. A fixed dimension vector is generated based on the variable length utterance. A semantic label is predicted for the variable-length utterance based on the fixed dimension vector. A second dialog state of the simulated conversation is determined based on the semantic label, and third audio data corresponding to simulated speech is transmitted based on the second dialog state.

14 Claims, 11 Drawing Sheets

(56) References Cited

U.S. PATENT DOCUMENTS

| | | | | |
|---|---|---|---|---|
| 2003/0091163 | A1* | 5/2003 | Attwater | G10L 15/1822 |
| | | | | 379/88.01 |
| 2004/0120476 | A1* | 6/2004 | Harrison | H04M 3/493 |
| | | | | 379/88.18 |
| 2007/0174057 | A1* | 7/2007 | Genly | H04N 5/4403 |
| | | | | 704/270 |
| 2014/0255886 | A1* | 9/2014 | Wang | G09B 5/00 |
| | | | | 434/169 |
| 2014/0272821 | A1* | 9/2014 | Pitschel | G09B 19/06 |
| | | | | 434/157 |
| 2017/0103740 | A1* | 4/2017 | Hwang | G06N 5/04 |
| 2017/0270919 | A1* | 9/2017 | Parthasarathi | G10L 15/02 |
| 2017/0372696 | A1* | 12/2017 | Lee | G10L 15/16 |
| 2018/0046614 | A1* | 2/2018 | Ushio | G06N 20/00 |
| 2018/0150725 | A1* | 5/2018 | Tate | G06K 9/209 |
| 2018/0150739 | A1* | 5/2018 | Wu | G06F 40/211 |
| 2018/0151177 | A1* | 5/2018 | Gemmeke | G10L 15/065 |
| 2018/0204562 | A1* | 7/2018 | Gong | G10L 13/00 |
| 2018/0329884 | A1* | 11/2018 | Xiong | G06N 3/0445 |
| 2018/0358005 | A1* | 12/2018 | Tomar | G06F 40/247 |
| 2019/0115008 | A1* | 4/2019 | Jiang | G10L 15/22 |

OTHER PUBLICATIONS

Lei, Yun, et al. "A novel scheme for speaker recognition using a phonetically-aware deep neural network." 2014 IEEE International Conference on Acoustics, Speech and Signal Processing (ICASSP). IEEE, May 2014, pp. 1695-1699. (Year: 2014).*

Miao, Yajie, Hao Zhang, and Florian Metze. "Speaker adaptive training of deep neural network acoustic models using i-vectors." IEEE/ACM Transactions on Audio, Speech, and Language Processing 23.11. Jul. 2015, pp. 1938-1949. (Year: 2015).*

Zhang, Chi, et al. "A novel i-vector framework using multiple features and PCA for speaker recognition in short speech condition." 2016 International Conference on Audio, Language and Image Processing (ICALIP). IEEE, Jul. 2016, pp. 499-503. (Year: 2016).*

Ramanarayanan, Vikram, Suendermann-Oeft, David, Lange, Patrick, Ivanov, Alexei, Evanini, Keelan, Yu, Zhou, Tsuprun, Eugene, Qian, Yao; Bootstrapping Development of a Cloud-Based Spoken Dialog System in the Educational Domain From Scratch Using Crowdsourced Data; Educational Testing Service, Research Report ETS RR-16-16; Jun. 2016.

Ramanarayanan, Vikram, Suendermann-Oeft, David, Ivanov, Alexei, Evanini, Keelan; A Distributed Cloud-Based Dialog System for Conversational Application Development; Proceedings of the SIGDIAL Conference; pp. 432-434; Sep. 2015.

Bobrow, Daniel; Natural Language Input for a Computer Problem Solving System; Artificial Intelligence Report No. 66, Massachusetts Institute of Technology; Mar. 1964.

Weizenbaum, Joseph; ELIZA—A Computer Program For the Study of Natural Language Communication Between Man and Machine; Communications of the ACM, 9(1); pp. 36-45; Jan. 1966.

Seneff, Stephanie; TINA: A Natural Language System for Spoken Language Applications; Computational Linguistics, 18(1); pp. 61-86; 1992.

Issar, Sunil, Ward, Wayne; CMU's Robust Spoken Language Understanding System; Proceedings of Eurospeech, 93; 1993.

Ward, Wayne, Issar, Sunil; Recent Improvements in the CMU Spoken Language Understanding System; Proceedings of the Workshop on Human Language Technology; pp. 213-216; 1994.

Dowding, John, Gawron, Jean Mark, Appelt, Doug, Bear, John, Cherny, Lynn, Moore, Robert, Moran, Douglas; GEMINI: A Natural Language System for Spoken-Language Understanding; Proceedings of the 31st Annual Meeting on Association for Computational Linguistics; pp. 54-61; 1993.

Levin, Esther, Pieraccini, Roberto; Concept-Based Spontaneous Speech Understanding System; 4th European Conference on Speech Communication and Technology; Madrid, Spain; pp. 555-558; Sep. 1995.

Schwartz, Richard, Miller, Scott, Stallard, David, Makhoul, John; Language Understanding Using Hidden Understanding Models; Proceedings of the 4th International Conference on Spoken Language; pp. 9997-1000; 1996.

Kuhn, Roland, De Mori, Renato; The Application of Semantic Classification Trees to Natural Language Understanding; IEEE Transactions on Pattern Analysis and Machine Intelligence, 17(5); pp. 449-460; May 1995.

He, Yulan, Young, Steve; A Data-Driven Spoken Language Understanding System; IEEE Transactions on Pattern Analysis and Machine Intelligence, 17(5); pp. 449-460; 2003.

Mesnil, Gregoire, He, Xiaodong, Deng, Li, Bengio, Yoshua; Investigation of Recurrent-Neural-Network Architectures and Learning Methods for Spoken Language Understanding; Interspeech; pp. 3771-3775; 2013.

Mesnil, Gregoire, Dauphin, Yann, Yao, Kaisheng, Bengio, Yoshua, Deng, Li, Hakkani-Tur, Dilek, He, Xiaodong, Heck, Larry, Tur, Gokhan, Yu, Dong, Zweig, Geoffrey; Using Recurrent Neural Networks for Slot Filling in Spoken Language Understanding; IEEE Transactions on Audio, Speech and Language Processing; 23(3); pp. 530-539; 2015.

Xu, Puyang, Sarikaya, Ruhi; Convolutional Neural Network Based Triangular CRF for Joint Intent Detection and Slot Filling; Automatic IEEE Workshop on Speech Recognition and Understanding; pp. 78-83; 2013.

Tur, Gokhan, Hakkani-Tur, Dilek, Heck, Larry, Parthasarathy, S.; Sentence Simplification for Spoken Language Understanding; IEEE International Conference on Acoustics, Speech and Signal Processing; pp. 5628-5631; 2011.

Graves, Alex, Jaitly, Navdeep; Towards End-to-End Speech Recognition with Recurrent Neural Networks Proceedings of the 31st International Conference on Machine Learning; Beijing, China; pp. 1764-1772; 2014.

Jaitly, Navdeep, Hinton, Geoffrey; Learning a Better Representation of Speech Sound Waves Using Restricted Boltzmann Machines; Proceedings of the International Conference on Acoustics, Speech and Signal Processing; pp. 5884-5887; 2011.

Seide, Frank, Li, Gang, Chen, Xie, Yu, Dong; Feature Engineering in Context-Dependent Deep Neural Networks for Conversational Speech Transcription; Proceedings of IEEE ASRU; pp. 24-29; 2011.

Miao, Yajie, Gowayyed, Mohammad, Metze, Florian; EESEN: End-to-End Speech Recognition Using Deep RNN Models and WFST-Based Decoding; Proceedings of the IEEE ASRU; pp. 167-174; 2015.

Bahdanau, Dzmitry, Chorowski, Jan, Serdyuk, Dmitriy, Brakel, Philemon, Bengio, Yoshua; End-to-End Attention-Based Large Vocabulary Speech Recognition; Proceedings of the IEEE International Conference on Acoustics, Speech and Signal Processing; pp. 4945-4949; 2016.

Bhargava, Mayank, Rose, Richard; Architectures for Deep Neural Network Based Acoustic Models Defined Over Windowed Speech Waveforms; Proceedings of Interspeech; Dresden, Germany; pp. 6-10; Sep. 2015.

Heigold, Georg, Moreno, Ignacio, Bengio, Samy, Shazeer, Noam; End-to-End Text-Dependent Speaker Verification; Proceedings of the International Conference on Acoustics, Speech and Signal Processing; pp. 5115-5119; 2016.

Geng, Wang, Wang, Wenfu, Zhao, Yuanyuan, Cai, Xinyuan, Xu, Bo; End-to-End Language Identification Using Attention-Based Recurrent Neural Networks; Proceedings of Interspeech; San Francisco, CA; pp. 2944-2948; Sep. 2016.

Trigeorigis, George, Ringeval, Fabien, Brucekner, Raymond, Marchi, Erik, Nicolaou, Mihalis, Schuller, Bjorn, Zafeirou, Stefanos; Adieu Features? End-to-End Speech Emotion Recognition Using a Deep Convolutional Recurrent Network; IEEE International Conference on Acoustics, Speech and Signal Processing; pp. 5200-5204; May 2016.

Audhkhasi, Kartik, Rosenberg, Andrew, Sethy, Abhinav, Ramabhadran, Bhuvana, Kingsbury, Brian; End-to-End ASR-Free Keyword Search From Speech; IEEE Journal of Selected Topics in Signal Processing, 11(8) pp. 1351-1359; Dec. 2017.

Huang, Qiang, Cox, Stephen; Task-Independent Call-Routing; Speech Communication, 48(3); pp. 374-389; 2006.

(56) References Cited

OTHER PUBLICATIONS

Gorin, A.L., Petrovksa-Delacretaz, D., Riccardi, G., Wright, J.H.; Learning Spoken Language Without Transcriptions; Proceedings of IEEE Workshop on Automatic Speech Recognition and Understanding, 99; 1999.

Alshawi, Hiyan; Effective Utterance Classification with Unsupervised Phonotactic Models; Proceedings of the Human Language Technologies: 2003 Conference of the North American Chapter of the Association for Computational Linguistics; pp. 1-7; May-Jun. 2003.

Wang, Ye-Yi, Lee, John, Acero, Alex; Speech Utterance Classification Model Training Without Manual Transcriptions; IEEE International Conference on Acoustics, Speech and Signal Processing, 1; Roulouse, France; pp. 553-556; 2006.

Ramanarayanan, Vikram, Suendermann-Oeft, David, Lange, Patrick, Mundkowsky, Robert, Ivanov, Alexei, Yu, Zhou, Qian, Yao, Evanini, Keelan; Assembling the Jigsaw: How Multiple Open Standards are Synergistically Combined in the HALEF Multimodal Dialog System; Ch. 13 in Multimodal Interaction with W3C Standards: Towards Natural User Interfaces to Everything; Springer; pp. 295-310; 2016.

Hinton, Geoffrey, Deng, Li, Yu, Dong, Dahl, George, Mohamed, Abdel-rahman, Jaitly, Navdeep, Senior, Andrew, Vanhoucke, Vincent, Nguyen, Patrick, Sainath, Tara, Kingsbury, Brian; Deep Neural Networks for Acoustic Modeling in Speech Recognition: The Shared Views of Four Research Groups; IEEE Signal Processing Magazine, 29(6); pp. 82-97; Nov. 2012.

Cheng, Jian, Chen, Xin, Metallinou, Angeliki; Deep Neural Network Acoustic Models for Spoken Assessment Applications; Speech Communication, 73; pp. 14-27; Oct. 2015.

Yu, Dong, Deng, Li, Dahl, George; Roles of Pre-Training and Fine-Tuning in Context-Dependent DBN-HMMs for Real-World Speech Recognition; Proceedings of NIPS Workshop on Deep Learning and Unsupervised Feature Learning; 2010.

Erhan, Dumitru, Bengio, Yoshua, Courville, Aaron, Manzagol, Pierre-Antoine, Vincent, Pascal, Bengio, Samy; Why Does Unsupervised Pre-Training Help Deep Learning?; Journal of Machine Learning Research, 11; pp. 625-660; 2010.

Chung, Yu-An, Wu, Chao-Chung,, Shen, Chia-Hao, Lee, Hung-Yi, Lee, Lin-Shan; Audio Word2Vec: Unsupervised Learning of Audio Segment Representations Using Sequence-to-Sequence Autoencoder; Interspeech; San Francisco, CA; pp. 765-769; Sep. 2016.

Bengio, Yoshua, Courville, Aaron, Vincent, Pascal; Representation Learning: A Review and New Perspective; IEEE Transactions on Pattern Analysis and Machine Intelligence, 35(8); pp. 1798-1828; Aug. 2013.

Povey, Daniel, Ghoshal, Arnab, Boulianne, Gilles, Burget, Lukas, Glembek, Ondrej, Goel, Nagendra, Hannemann, Mirko, Motlicek, Petr, Qian, Yanmin, Schwarz, Petr, Silovsky, Jan, Stemmer, Georg, Vesely, Karel; The Kaldi Speech Recognition Toolkit; Proceedings of the ASRU Workshop; 2011.

Hochreiter, Sepp, Schmidhuber, Jurgen; Long Short-Term Memory; Neural Computation, 9(8); pp. 1735-1780; 1997.

Cieri, Christopher, Miller, David, Walker, Kevin; The Fisher Corpus: a Resource for the Next Generation of Speech-to-Text; LREC, 4; pp. 69-71; 2004.

Peddinti, Vijayaditya, Povey, Daniel, Khudanpur, Sanjeev; A Time Delay Neural Network Architecture for Efficient Modeling of Long Temporal Contexts; Proceedings of Interspeech; 2015.

Qian, Yao, Wang, Xinhao, Evanini, Keelan, Suendermann-Oeft, David; Self-Adaptive DNN for Improving Spoken Language Proficiency Assessment; Interspeech; San Francisco, CA; pp. 3122-3126; Sep. 2016.

* cited by examiner

200

| Question | Imagine you saw your coworker make a mistake. Which do you think would be better? To tell the co-worker about the mistake or to speak with your manager? |
|---|---|
| Response | I would talk to the team member and ask him to rectify their mistake and it is a better way of resolving the issue. |
| Semantic Label | coworker |
| Response | Speaking with the manager is the best thing I guess. |
| Semantic Label | manager |
| Response | Yeah if it is a normal issue, then I'll go and discuss with the uh uh coworker himself. If it is something big, then I'll go to manager and I will discuss with him and we will come to the solution. |
| Semantic Label | depends |
| Response | Uh uh currently I am staying in India. Eh. |
| Semantic Label | nomatch |

FIG. 2

Table 3: WER(%) of ASR systems built with different corpora

| Dialog State | PF | WE | SG | MT | All | Ref |
|---|---|---|---|---|---|---|
| Fisher | 86.4 | 88.8 | 84.2 | 98.9 | 88.1 | 22.2 |
| NNS | 54.3 | 62.6 | 52.0 | 54.8 | 55.5 | 18.5 |
| SDS | 35.4 | 55.8 | 45.0 | 55.1 | 49.4 | N/A |
| NNS+SDS | 35.8 | 50.1 | 39.5 | 46.1 | 43.5 | N/A |

Table 4: Accuracy(%) of different SLU systems

| Dialog State | PF | WE | SG | MT | All |
|---|---|---|---|---|---|
| E2E (JIT) | 56.3 | 79.4 | 53.7 | 75.4 | 64.1 |
| E2E (NNS) | 62.3 | 81.3 | 54.1 | 76.4 | 66.7 |
| E2E (NNS+SDS) | 63.0 | 82.4 | 54.9 | 76.8 | 67.4 |
| ASR+NLU (NNS), DT+BW | 64.6 | 75.5 | 63.4 | 72.5 | 68.0 |
| ASR+NLU (SDS), DT+BW | 79.0 | 87.3 | 59.2 | 73.4 | 74.0 |
| ASR+NLU (NNS+SDS), DT+BW | 81.8 | 87.3 | 67.1 | 77.5 | 77.6 |
| ASR+NLU (Transcription), DT+BW | 82.9 | 92.2 | 57.9 | 53.6 | 70.6 |
| ASR+NLU (NNS+SDS), CNN | 89.0 | 91.2 | 79.3 | 84.8 | 85.6 |
| Fusion (CNN, E2E) | 89.0 | 94.1 | 79.9 | 85.5 | 86.5 |
| Majority Vote | 53.6 | 79.4 | 45.7 | 70.3 | 59.8 |

FIG. 7

EXPLORING ASR-FREE END-TO-END MODELING TO IMPROVE SPOKEN LANGUAGE UNDERSTANDING IN A CLOUD-BASED DIALOG SYSTEM

CROSS-REFERENCE TO RELATED APPLICATIONS

This application claims priority to U.S. Provisional Application No. 62/589,961, filed Nov. 22, 2017, the entirety of which is herein incorporated by reference.

TECHNICAL FIELD

The technology described herein relates to automated speech assessment.

BACKGROUND

Spoken language understanding (SLU) in dialog systems is generally performed using a natural language understanding (NLU) model based on the hypotheses produced by an automatic speech recognition (ASR) system. However, when new spoken dialog applications are built from scratch in real user environments that often have sub-optimal audio characteristics, ASR performance can suffer due to factors such as the paucity of training data or a mismatch between the training and test data.

SUMMARY

Systems and methods are provided for conducting a simulated conversation with a language learner include determining a first dialog state of the simulated conversation. First audio data corresponding to simulated speech based on the dialog state is transmitted. Second audio data corresponding to a variable length utterance spoken in response to the simulated speech is received. A fixed dimension vector is generated based on the variable length utterance. A semantic label is predicted for the variable-length utterance based on the fixed dimension vector. A second dialog state of the simulated conversation is determined based on the semantic label, and third audio data corresponding to simulated speech is transmitted based on the second dialog state.

BRIEF DESCRIPTION OF THE FIGURES AND DRAWINGS

FIG. 2 depicts a table that compares potential responses in an exemplary simulated conversation in a spoken dialog system.

FIG. 7 depicts a table of WER (%) of ASR systems built with different corpora and a table of accuracies of different SLU systems.

Figure 1:
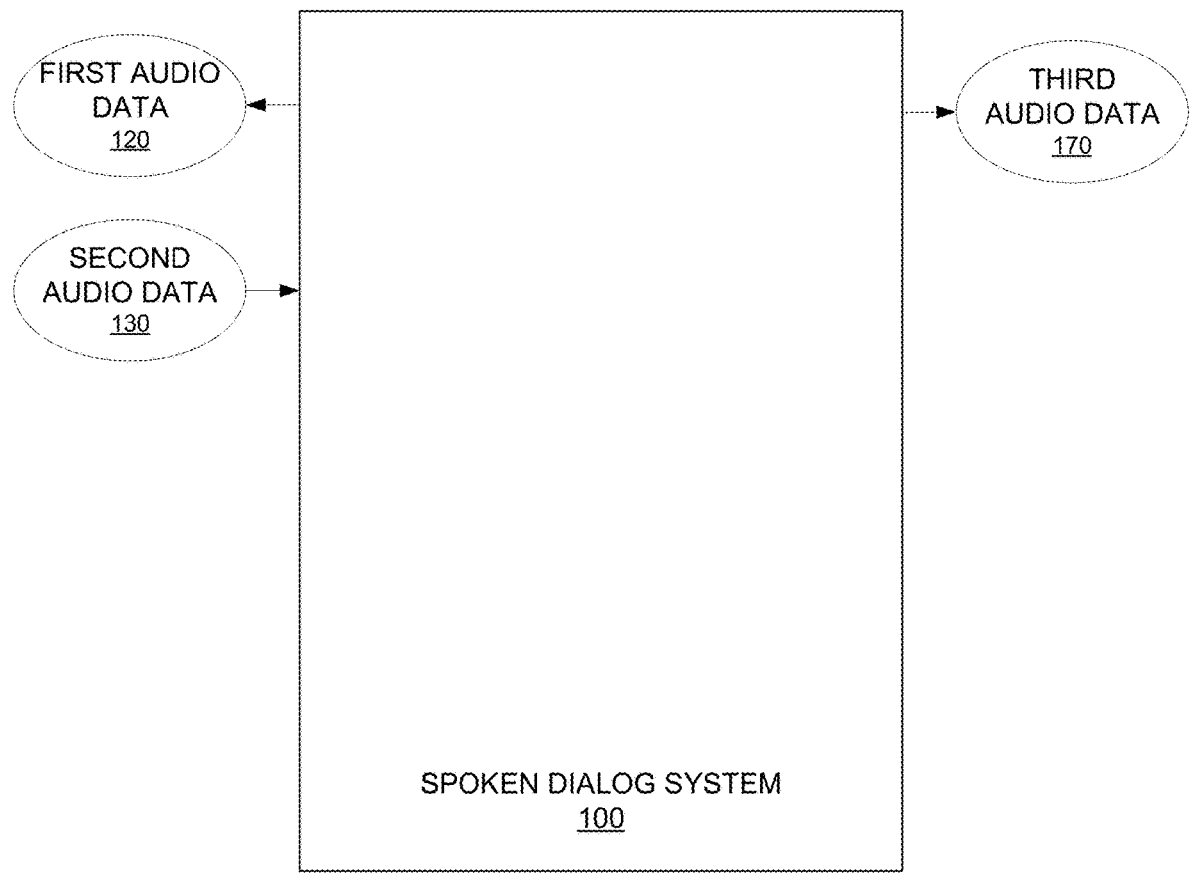
FIG. 1 depicts a spoken dialog system.

FIGS. 9A, 9B, 9C, and 9D depict example systems for implementing various aspects described herein.

DETAILED DESCRIPTION

Recent advances in deep learning with big data have significantly improved the performance of speech recognition, language understanding, and machine translation, which have in turn accelerated spoken dialog systems (SDSs) to move towards offering a more natural, intuitive, robust, and effective interaction. However, when new spoken dialog applications are built from scratch in real user environments that often have sub-optimal audio characteristics, ASR performance can suffer due to factors such as the paucity of training data or a mismatch between the training and test data. This is because it is difficult to obtain large amounts of matched training data from real production environments when developing new applications from scratch, requiring them to be bootstrapped from relatively cleaner, but mismatched data (e.g., data captured in a different/off nominal sound environment, data associated with speakers having a different native language or dialect from production environment speakers). And as one might expect, spoken language understanding (SLU), which is the interpretation of the meaning conveyed by speech utterances, thereby playing a key role in deciding appropriate system actions in SDSs, can be adversely affected by data mismatch.

State-of-the-art SLU systems generally contain two components: the automatic speech recognizer (ASR), which decodes the input speech into text, and the natural language understanding (NLU) module, that transforms the ASR hypothesis into a concept or semantic label that can drive subsequent SDS behavior. The two components are typically based on statistical approaches trained on a large amount of data with various machine learning methods. Unlike NLU on written text, the efficiency of the SLU largely depends on the performance of ASR and its capability to handle errors and the vagaries of spontaneous speech, e.g., hesitations, corrections, repetitions, and other disfluencies.

Crowdsourcing techniques can facilitate obtaining data for bootstrapping a SDS in quick and cost-effective manner. But dialog data crowdsourced from (i) non-native English speakers in (ii) potentially adverse or uncontrolled audio environments and (iii) collected over poor internet connections poses a significant challenge to SLU due to its dependence on ASR. For example, there may be a large variation in the quality of recorded speech due to the difficulty in controlling participants' recording equipment and environment. The poor audio quality could be either caused by wave distortions, e.g., clipping occurs when an amplifier is overdriven, by packet loss resulting in dead silence when the internet transmission is unstable, or by large amounts of background noise resulting in low signal-to-noise ratio (SNR). Exacerbating this, as mentioned earlier, the non-native speech collected by SDS-based language learning applications may contain pronunciation errors, large numbers of disfluencies, ungrammatical phrases, loan words, etc., which make the ASR output even worse. In such cases, human experts may also find it difficult to transcribe such poor-quality non-native speech.

FIG. 1 depicts an exemplary a spoken dialog system 100 that employs an ASR-less end-to-end modeling (E2E) approach. The spoken dialog system 100 may be used by a language learner in a simulated conversation. For example, the spoken dialog system 100 may provide speaking practice for non-native speakers of English in the context of a simulated job interview. The conversation may begin as a system-initiated dialog in which a representative at a job placement agency interviews the language learner about the type of job they are looking for and their qualifications. The spoken dialog system 100 transmits first audio data 120 that corresponds to simulated speech, such as simulated speech that asks a question. The spoken dialog system 100 receives second audio data 130 that corresponds to a spoken in utterance that is responsive to the simulated speech. The spoken dialog system 100 processes the second audio data 130 and transmits third audio data 170 that corresponds to a simulated response to the language learner's utterance. This process may repeat until the simulated job interview task is complete.

Figure 3:
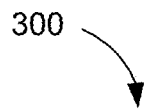
FIG. 3 depicts a table of dialog states and semantic labels for each dialog state.

An example of dialog states in an exemplary job interview task, including question, responses, and corresponding semantic labels, is shown in a table 200 in FIG. 2. FIG. 3 depicts a table 300 that lists the semantic labels associated with each dialog state. One aim of the task is to provide interactive feedback to language learners about whether they have demonstrated the linguistic skills necessary to provide appropriate, intelligible responses to the interviewer's questions and to complete the communicative task successfully.

The data in the tables are based on crowdsourced data obtained by interacting with non-native interlocutors in a job interview task. The collected dialog corpus consisted of 4,778 utterances spoken by 1,179 speakers. 4,191 utterances are used as a training set and the rest of 586 utterances are used as a testing set. 200 utterances randomly selected from the corpus are used to manually check the audio quality by reading the waveform and spectrogram together with listening to the sound. The percentage of labels for bad quality (perceptibly clipping distortion, packet loss or large background noise), no voice, and good quality are 62.5%, 8.5% and 29%, were found separately. The quality of transcriptions was checked by Levenstein distance between the transcriptions from different transcribers for the same utterance, i.e., calculating word error rate (WER) by assuming one transcription is reference and another one is recognition hypotheses. It shows that the average inter-transcriber WER is 38.3% measured on 1,004 utterances/10,288 tokens. This corpus is hereafter referred to as the job interview task (JIT) corpus.

Early attempts aimed at language understanding included computer programs such as STUDENT, which was developed at MIT to read and solve word problems found in high school algebra books and the chat-bot ELIZA, which used simple pattern matching to carry on a conversation on any topic. For most of the early language understanding systems, semantic parsers based on hand-crafted rules were widely used. In the 1990s, several research studies were carried out for the Airline Travel Information System (ATIS) project. The initial systems developed for this study used semantic rules to extract task specific information from slots in a frame. MIT's TINA, CMU's Phoenix, and SRI's GEMINI are examples of such knowledge-based systems. Although these systems were seen to perform very well, a major drawback of using handcrafted rules is that it is time-consuming and laborious in terms of human effort to construct such rules. These rules are highly specific to the applications they were designed for and lack robustness to errors and irregularities. In real world spoken dialog applications, new words and unseen speech utterances are encountered regularly, thereby increasing the vocabulary and corpus size. Hand-crafted rules can result in misclassification for such utterances that are not covered by the fixed-grammar rules.

To reduce the amount of human effort in building SLU models, some statistical models such as AT&T's Chronus system that applied a Markov model based approach where a set of concepts corresponding to hidden states were used for semantic representation. Machine learning techniques were used in the BBN-HUM model that was developed for the ATIS task for understanding sentences and extracting their meaning with respect to the preceding sentences. Some other statistical approaches to semantic parsing include semantic classification trees (SCTs) (decision trees with nodes representing regular expressions) in which semantic rules are learned automatically from the training corpus to build a natural language understanding system or the application of a hidden vector state (HVS) model to hierarchical semantic parsing. Most state-of-the-art techniques involve the use of deep learning for understanding based on transcriptions or ASR hypothesis.

Figure 4:
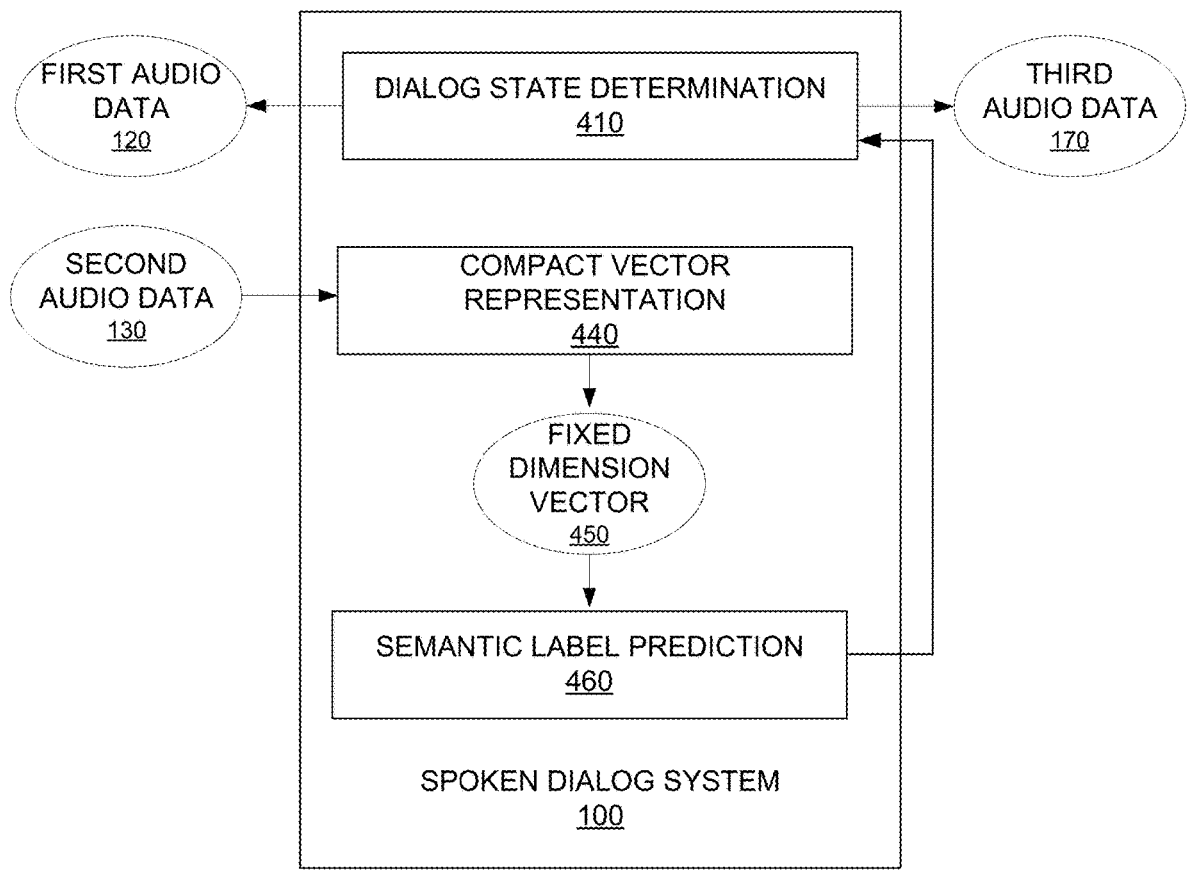
FIG. 4 depicts a a spoken dialog system, in accordance with some embodiments.

FIG. 4 depicts a spoken dialog system 100 that does not employ ASR, in accordance with some embodiments. The spoken dialog system 100 is configured to simulate a conversation comprising multiple tasks. A dialog state determination module determines a dialog state and transmits first audio data 120 based on the dialog state. A language learner receives the first audio data 120 and provides a spoken response in the form of second audio data 130. The spoken dialog system 100 receives the second audio data 130 in the form of a variable-length utterance. The variable-length utterance is processed by the system and used to generate a fixed dimension vector 450 that is used to perform semantic label prediction with semantic label prediction module 460.

The compact vector representation module 440 determines a compact representation for the variable-length utterance. The compact vector representation module 440 can use one of two approaches to compact audio feature representation by using unsupervised learning.

Given an utterance comprising a variable-length sequence of acoustic feature vectors, a low-dimensional fixed-length vector is generated and then fed into a feedforward neural network trained in the sense of transfer learning to predict a semantic category of the utterance. Because no ASR is required, the training time and semantic decoding time of the system can be much faster than conventional approaches.

Figure 5:
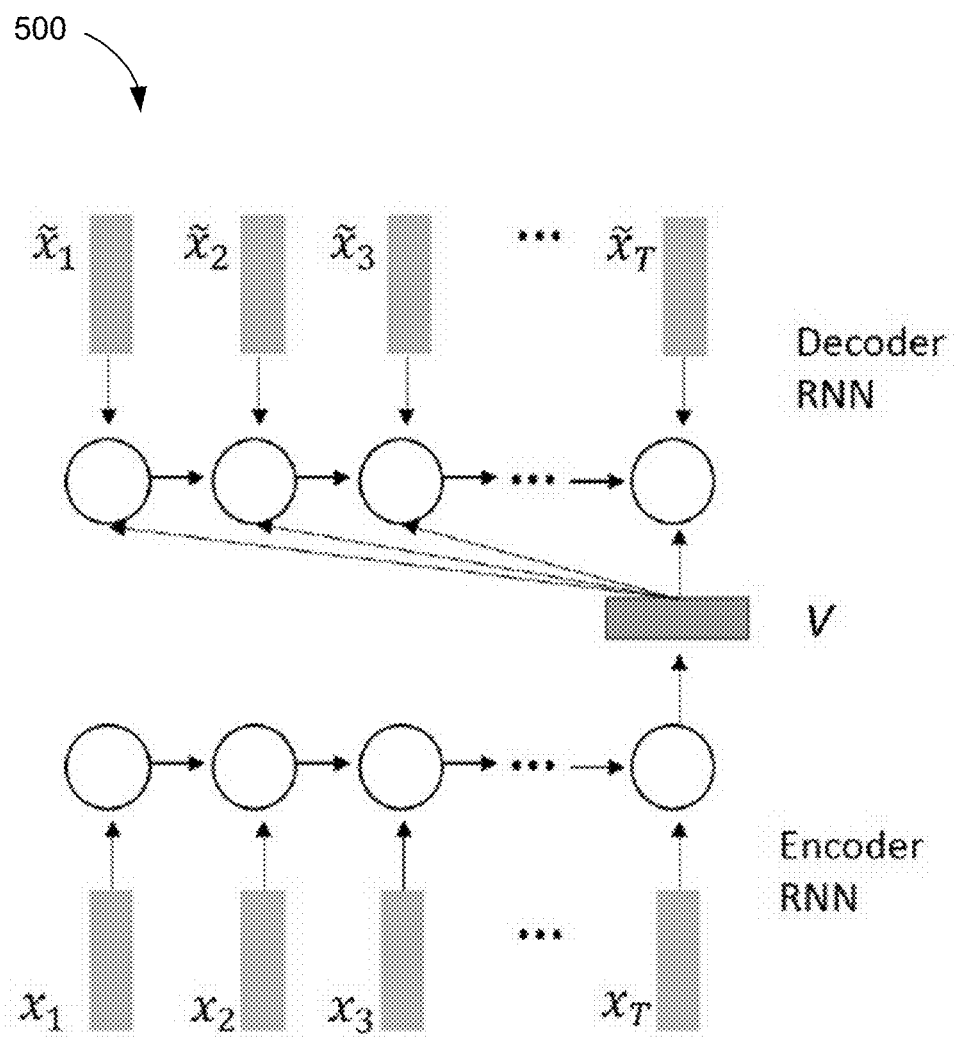
FIG. 5 depicts a recurrent neural network (RNN) acoustic auto encoder and decoder that can be used in a spoken dialog system.

A first approach is an RNN-based acoustic auto-encoder as shown in FIG. 5. It depicts the structure of a sequence-to-sequence auto-encoder which contains two RNNs: Encoder RNN and Decoder RNN. The acoustic feature vector sequence $\{x_1, x_2, \ldots, x_T\}$ is mapped into a vector representation in a fixed dimensionality V by the Encoder RNN, and the Decoder RNN reconstructs another sequence $\{\hat{x}_1, \hat{x}_2, \ldots, \hat{x}_T\}$ from vector V to minimize the reconstruction error, generally measured as the mean squared error between X and $\hat{X}$.

A second approach is to represent a variable length speech utterance into a low-dimensional subspace based on factor analysis. The t-th frame of an utterance, $x_t$, is sampled from the following distribution:

$$x_t \sim \sum_j \gamma_{jt} N\left(m_j + T_j V, \sum_j\right)$$

where $m_j$ and $\Sigma_j$ are the mean and covariance of the j-th Gaussian component if a Gaussian mixture model (GMM) is used to train a universal background model (UBM). A GMM is an efficient method for modeling an arbitary distribution of acoustic feature vectors in a unsupervised manner using the EM algorithm. $\gamma_{jt}$ is the statistical alignment result of the frame $x_t$, i.e., the posterior probability calculated from a UBM; $T_j$ is the total variability, a low-rank rectangular matrix which is estimated by using the EM algorithm; Vis the utterance-specific standard normal distributed latent vector obtained by using maximum a posterior (MAP) estimation.

A compact representation for the variable length utterance may be used for semantic label modeling. The approach is inspired by two popular techniques: (i) pre-training, which initializes DNN weights to a better starting point than random initialization prior to backpropagation (BP), which in turn helps facilitate a rapid convergence of the BP process, and (ii) the auto-encoder, which is used to learn a compact lower-dimensional feature representation of a higher-dimensional input feature vector sequence.

The semantic label prediction module 460 may be implemented as an RNN, for example, a decoder RNN as shown in FIG. 5. In the RNN, transfer learning or multi-task learning can exploit commonalities between the training data of different learning tasks so as to transfer learned knowledge from one task to another. Multi-task learning can be used to the semantic utterance classification by assuming each dialog state as one task.

The task of predicting semantic labels for spoken utterances can be treated as a semantic utterance classification task, which aims at classifying a given utterance into one of M semantic classes, $\hat{c}^k \in \{c_1^k, \ldots, c_M^k\}$, where k is the dialog state index. A compact representation for the utterance in variable length is determined. The resultant low-dimensional feature vector is employed to perform semantic label modeling. This approach is inspired by two popular techniques: (i) pre-training, which initializes Deep Neural Networks (DNN) weights to a better starting point than random initialization prior to back-propagation (BP), which in turn helps facilitate a rapid convergence of the BP process, and (ii) the auto-encoder, which is used to learn a compact lower-dimensional feature representation of a higher-dimensional input feature vector sequence.

One way to model semantic utterance classification is to use a sequence-to-tag function, where the input X is a sequence of speech feature vectors $X=\{x_1, x_2, \ldots, x_T\}$; $x_t$ is the speech feature vector, e.g., MFCC, in t-th frame; T is the total number of frames in an utterance, and output C is the semantic label. Recurrent neural networks (RNNs) can use their internal memory to process an arbitrary length of inputs and are successfully applied to solve a wide range of machine learning problems that involve sequential data. RNNs can be used to learn a sequence-to-tag function for predicting semantic labels from speech. Frame-level speech features are used as input layer. The output layer is a softmax layer which contains dialog-state-dependent semantic labels represented by a one-hot vector.

This approach may suffer from limited training data. Speech acoustic features vary largely from the factors, e.g., age, gender, dialectal background and personal style. Even for the same speaker, the actual values change from time to time due to different phone sequences spoken. Therefore, a large number of spoken utterance with semantic categories is required for training to get a decent classifier.

FIG. 5 depicts a recurrent neural network (RNN) acoustic auto encoder and decoder that can be used in a spoken dialog system. The input layer is the fixed-dimensional vector V output from either RNN encoder or factor analysis as the representation of variable length acoustic feature vector sequence and output layer is the softmax layer with K one-hot vectors (each vector represents one dialog state).

An SDS that leverages different open-source components to form a framework that is cloud-based, modular and standards-compliant, is used. This framework is employed to develop conversational applications and collect data using a crowdsourcing setup. In this iterative data collection framework, the data logged to the database during initial iterations is transcribed, annotated, rated, and finally used to update and refine the conversational task design and models for speech recognition and spoken language understanding. Because the targeted domain of the tasks in this study is conversational practice for English language learners, crowdsourcing user pool was restricted to non-native speakers of English.

FIG. 7 depicts a table 700 of word error rate (WER) of ASR systems built with different corpora and a table 710 of accuracy of different SLU systems.

WER and prediction accuracy can be to evaluate the performance of ASR and SLU on the testing set of JIT corpus. Our proposed ASR-free E2E approach does not require any transcriptions from the three corpora mentioned in Section 5.1. The acoustic features extracted from NNS and SDS corpora are used to train LSTM-RNN auto-encoder and the GMM for factor analysis in the sense of unsupervised learning. The preliminary results show that the performance of LSTM-RNN and factor analysis has no significant difference regarding the extraction of compact representation V from variable length of utterance in our tasks. V extracted from factor analysis slightly outperforms that extracted from LSTM-RNN.

The performance of different ASR systems, in terms of WER, on the testing set of JIT corpus is shown in a table 710 in FIG. 7. The WERs are broken down by dialog state as well as those of overall (All) and the reference (Ref), which are tested on the matched data sets. The state-of-the-art DNN-based ASR trained on the Fisher corpus using Kaldi can achieve 22.2% WER on its own testing set. Although the Fisher corpus is a collection of conversational telephone speech, it still has a significant mismatch with the speech collected by SDS and results in a very high WER. The DNN-based ASR system with i-Vector based speaker adaptation technology trained on the NNS corpus (which is also a collection of non-native speakers' speech), can obtain the WERs of 18.5% and 23.3% on monologue and dialogue data sets respectively (using LM interpolation technology to compensate for the speaking style difference across tasks). However, when it is applied to recognize the data collected by SDS, the WER is degraded to 55.5% even when using the transcriptions from the training set of the JIT corpus for language model adaptation. Using data collected by SDS or combining NNS corpus with SDS corpus can significantly improve the performance of ASR, i.e., the WERs on JIT testing set are reduced to 49.4% and 43.5%, respectively. While this is still a very large WER value, it should be analyzed in light of the fact that the average inter-transcriber WER is also quite large at 38.3%. Reducing both the ASR and inter-transcriber WERs for such data are crucial to improving system performance in real world environmental conditions and usage scenarios, and pose an interesting challenge to the speech processing research community going forward.

Table 710 shows the performance of SLU in terms of semantic prediction accuracy from different systems. The corpora in the bracket for E2E systems indicate the corpora used to train total variability matrix, which is employed to project the variable length utterance to fixed length feature vector V. Our E2E approach performs much better than the majority vote baseline, i.e., the accuracy is improved from 59.8% to 64.1% and there is no degradation for dialog state dependent performance. SDS and NNS corpora can cover large amount of acoustic variations and V extractor trained on them can yield superior discrimination for semantic classification. The overall accuracy of E2E (NNS+SDS) is improved by 3.3%, comparing with that of E2E (JIT), where the V extractor is trained on JIT corpus, and the dialog state of PF (Part or Full) achieves the largest gains among the four dialog states, i.e., the accuracy is improved by 6.7%.

The SLU performance of conventional ASR+NLU systems are also shown in Table 700. The corpora in the bracket for ASR+NLU systems indicate the corpora used for building ASR system. Clearly, the observed trend is that the lower the ASR WER, the higher the accuracy of the SLU. It is interesting that the SLU trained on transcription does not outperform the SLU trained on the hypothesis produced by ASR system, which may be a result of the inconsistency and the ambiguity present in the human transcriptions used. The E2E SLU system of E2E (NNS), which doesn't require any transcription for modeling and ASR system for transcribing the spoken utterance into text, can be on par with the system of ASR+NLU (NNS).

The ASR-free E2E modeling approach can be evaluated in a spoken-dialog-based language learning application by comparing it with the conventional approach of combining ASR and NLU. The conventional ASR+NLU approach to SLU requires a competent ASR system. Generally it needs over a hundred hours of speech collected under real usage scenarios (along with associated transcriptions for acoustic and language modeling) to obtain a reasonable ASR system performance. This is an important factor to take into consideration when one uses deep learning methods, the recognition performance increases monotonically with more training data. Any new application can be continuously improved by using a cycle of data collection.

Two corpora are used to build the ASR system. One corpora is drawn from a large-scale global assessment of English proficiency, which measures a non-native speaker's ability to use and understand English at the university level. The speaking tasks in this test elicit monologues of 45 or 60 seconds in duration; example tasks include expressing an opinion on a familiar topic or summarizing information presented in a lecture. The corpora contains over 800 hours of nonnative spontaneous speech covering over 100 L1s (native languages) across 8,700 speakers. This corpus is hereafter referred to as the non-native speech (NNS) corpus. A second corpora is collected by our SDS via crowdsourcing for different spoken dialog based applications. The job interview task is one of the tasks based on language learning application. This corpus is collected under realistic usage scenarios. The acoustic environments and speaking styles were matched with the data of job interview task. It contains 41,185 utterances (roughly 50 hours). This corpus is hereafter referred to as the SDS corpus.

ASR systems are constructed by using the tools from Kaldi. A GMM-HMM is first trained to obtain senones (tied tri-phone states) and the corresponding aligned frames for DNN training. The input feature vectors used to train the GMM-HMM contain 13-dimensional MFCCs and their first and second derivatives. Contextual dependent phones, triphones, are modeled by 3-state HMMs and the pdf of each state is represented by a mixture of 8 Gaussian components. The splices of 9 frames (4 on each side of the current frame) are projected down to 40-dimensional vectors by linear discriminant analysis (LDA), together with maximum likelihood linear transform (MLLT), and then used to train the GMM-HMM by using maximum likelihood estimation. Concatenated MFCC features and i-vector features, which is a promising approach to speaker adaptation for speech recognition, are used for DNN training. The input features stacked over a 15 frame window (7 frames to either side of the center frame for which the prediction is made) are used as the input layer of DNN. The output layer of the DNN consists of the senones of the HMM obtained by decision-tree based clustering. The input and output feature pairs are obtained by frame alignment for senones with the GMM-HMM. The DNN has 5 hidden layers, and each layer contains 1,024 nodes. The Sigmoid activation function is used for all hidden layers. All the parameters of the DNN are firstly initialized by pre-training, then trained by optimizing the cross-entropy function through BP, and finally refined by sequence-discriminative training, state-level minimum Bayes risk (sMBR).

The Bag of Words model is used as a feature for training the NLU. In this model, a text string (recognized hypothesis sequence) is represented as a vector based on the occurrence of each word. Dialog state dependent models are trained to perform multi-class classification of Bag of Words features using decision tree classifier. Apart from the conventional NLU method, the approach of using convolutional neural networks (CNNs) is also investigated in this study. The input tokenized text string is firstly converted to a 2D tensor with the shape (maximum length of word*the dimension of word-embedding), and then fed into a 1D convolution network with multiple filters, finally the maximum values from all filters via max pooling are formalized as a vector to predict the sematic labels by softmax output layer. The CNN is constructed using the Keras Python package and the structure of CNN is configured as follows: 300-dim word embedding vectors trained from Google news; the rectified linear unit (ReLU) activation function and dropout with (p=0.5); categorical cross-entropy loss function and Adadelta optimizer used in the training.

To overcome vanishing gradient problem occurred in RNN-based machine learning, long short-term memory (LSTM) RNN is used for RNN encoder-decoder. The input features to the LSTM-RNN is 13-dim static MFCCs without delta features and stacked frame window because RNN architecture already captures the long-term temporal dependencies between the sequential events. The silences at the beginning and ending of utterances are deleted through an energy-based voice activity detection (VAD) method. A two layer stacked LSTM is employed. The number of LSTM cell is 640. The encoder and decoder RNN were unfolded for 10 seconds or 1,000 time steps. 10 seconds is the median length of utterances in our corpus. All feature sequences are either padded or downsampled to make their length equal to 1,000 time steps. A linear layer with 400 nodes, i.e., the dimension of V in the FIG. 1 is 400, is used to compute the embedding from the final hidden layer of the encoder RNN. A backpropagation through time (BPTT) learning algorithm is used to train LSTM-RNN parameters.

Figure 6:
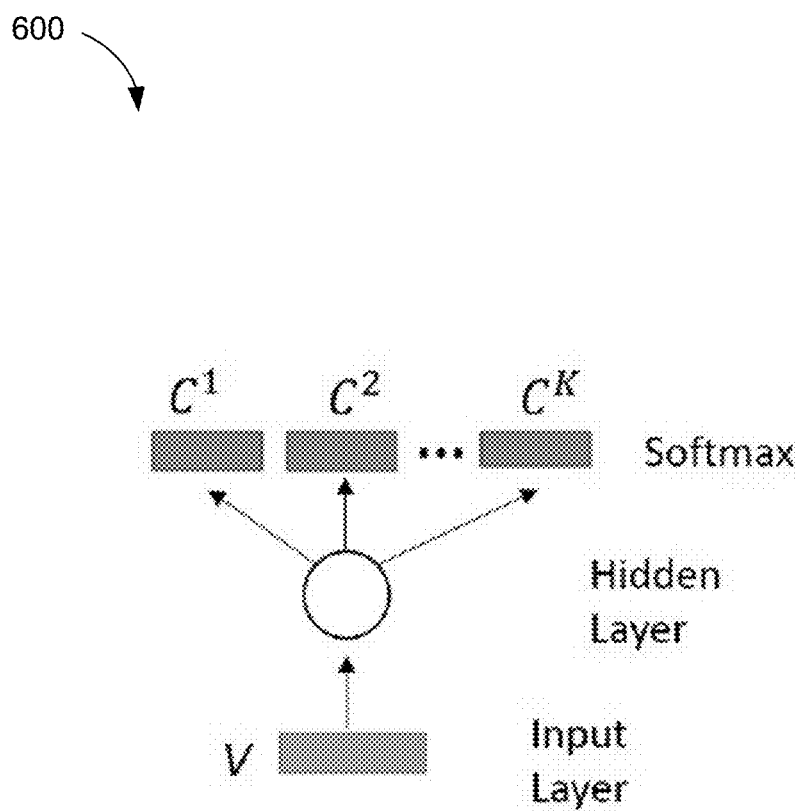
FIG. 6 depicts a feedforward neural network (NN) that can be used in a spoken dialog system.

FIG. 6 depicts a feedforward neural network (NN) that can be used in a spoken dialog system. Two hidden layers, each layer with 128 nodes, are used for multitask learning with feedforward NN. Input layer of NN is 400-dim V and output layer of NN has 15 nodes separated by four tasks. All parameters of NN are trained by optimizing cross-entropy function through BP. The parameters in hidden layers are updated by using all data in the training set of JIT corpus while the corresponding dialog state dependent data is used to update the parameters in the top layer of NN.

ASR-free E2E system predicts the semantic labels from low-level raw acoustic features while ASR+NLU system predict the semantic labels from high-level word hypotheses. These two systems can compensate for each other. Score-level fusion can be adopted by using the semantic label posterior outputs generated from two neural networks as the input features to a support vector classifier to predict the semantic labels again.

The decision tree classifier and the Bag of Words features (DT+BW) are used as the conventional NLU in this study due to the latency issue, which requires a fast response in a cloud-based dialog system. CNN-based semantic utterance classification approach is fused an ASR-free E2E approach. The experimental results show that the semantic label prediction accuracy can be significantly improved, i.e., the overall accuracy is improved from 77.6% to 85.6%, by CNN approach, and the score-level fusion by using posteriors output from these two approaches can further improve the accuracy from 85.6% to 86.5%.

In the ASR-less system, acoustic features used for factor analysis contain 13 dimensional MFCCs along with their first and second derivatives. Non-speech segments within utterances are deleted through the same VAD method used in autoencoder. Utterance-based cepstral mean normalization is performed on the acoustic feature vectors. A GMM with 1,024 components and a full covariance matrix was trained as the UBM. To make a fair comparison to LSTM-RNN encoder-decoder based feature representation, the same dimensional latent vector, i.e., 400-dim V used in Equation 1, is extracted from T-matrix trained by EM algorithm with the training set.

Figure 8:
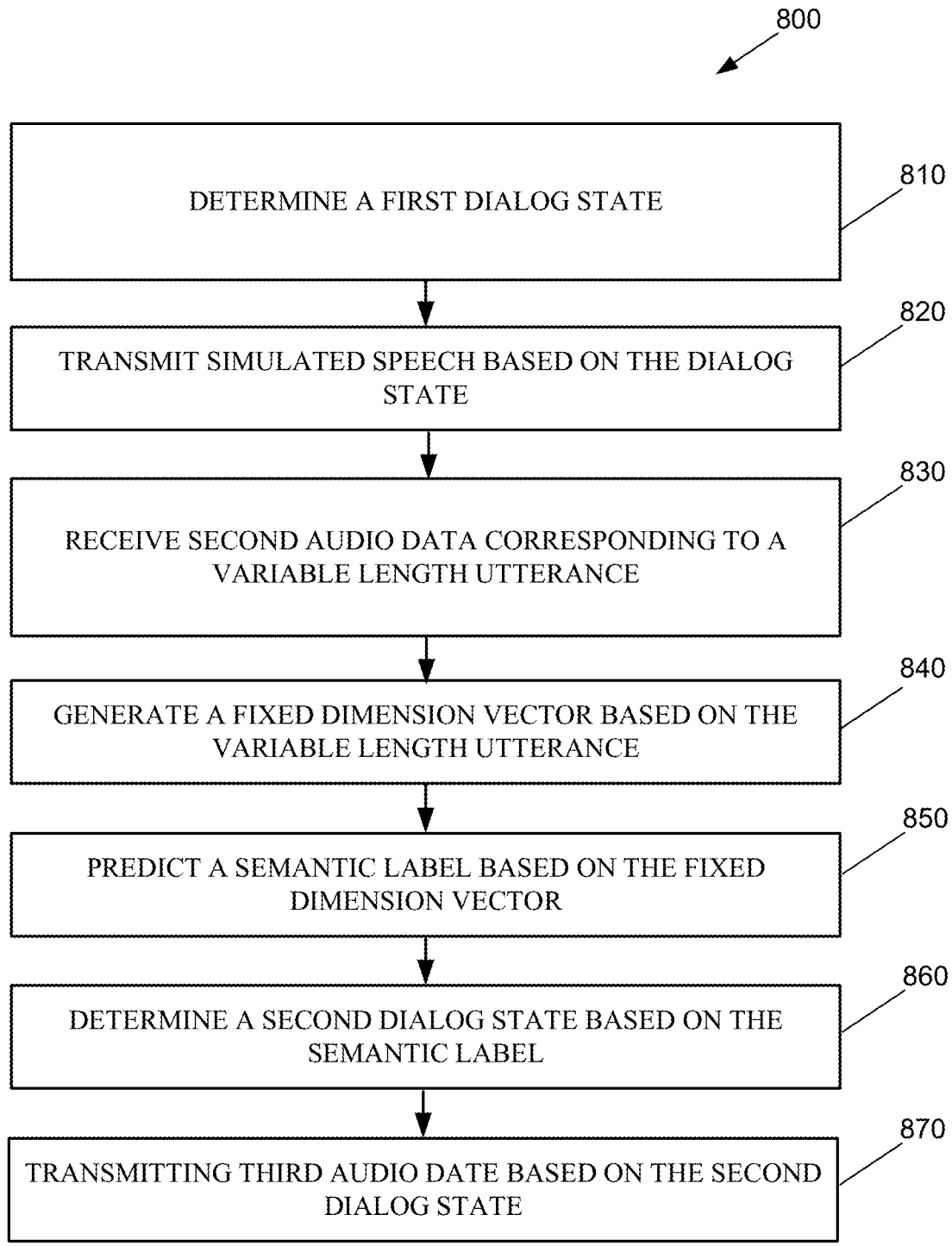
FIG. 8 depicts a flow diagram for a method for conducting a simulated conversation with a language learner.

FIG. 8 depicts a flow diagram for a method for conducting a simulated conversation with a language learner. The method includes determining a first dialog state of the simulated conversation at 810. At 820, first audio data corresponding to simulated speech based on the dialog state is transmitted. At 830, second audio data corresponding to a variable length utterance spoken in response to the simulated speech is received. A fixed dimension vector is generated at 840 based on the variable length utterance. At 850, a semantic label is predicted for the variable-length utterance based on the fixed dimension vector. A second dialog state of the simulated conversation is determined at 860 based on the semantic label, and third audio data corresponding to simulated speech is transmitted based on the second dialog state at 870.

The methods and systems described herein may be implemented using any suitable processing system with any suitable combination of hardware, software and/or firmware, such as described below with reference to the non-limiting examples of FIGS. 9A, 9B, 9C, and 9D.

Figure 9A:
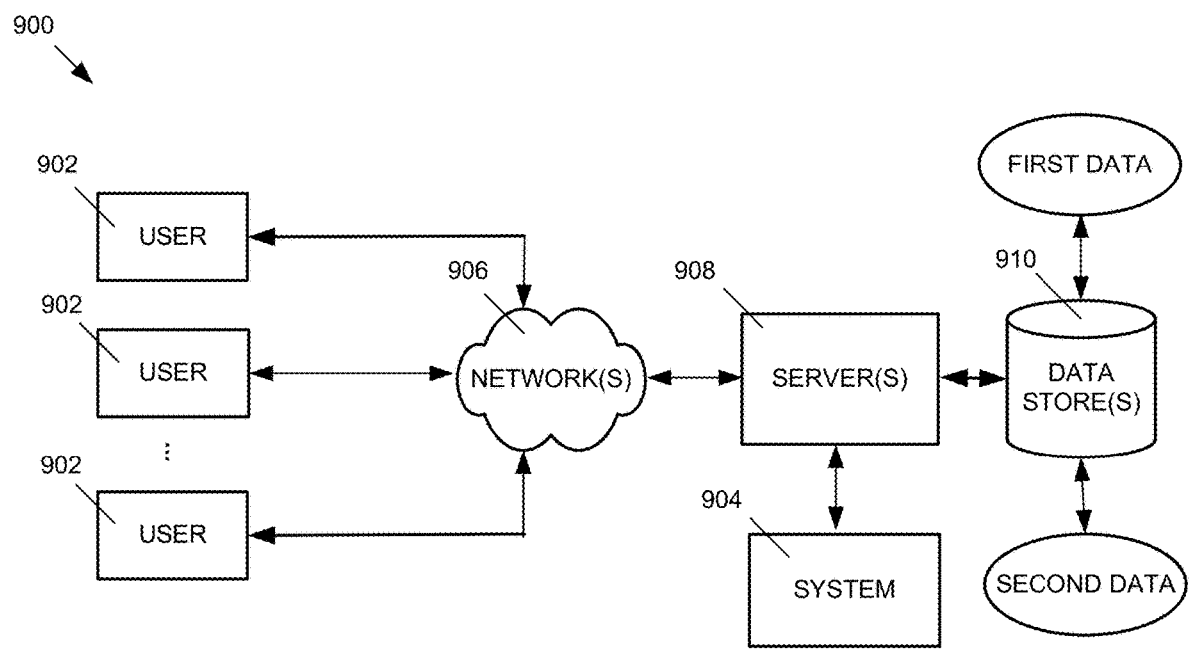

FIG. 9A depicts at 900 a computer-implemented environment wherein users 902 can interact with a system 904 hosted on one or more servers 908 through a network 906. The system 904 contains software operations or routines. The users 902 can interact with the system 904 through a number of ways, such as over one or more networks 906. One or more servers 908 accessible through the network(s) 906 can host system 904. It should be understood that the system 904 could also be provided on a stand-alone computer for access by a user.

Figure 9B:
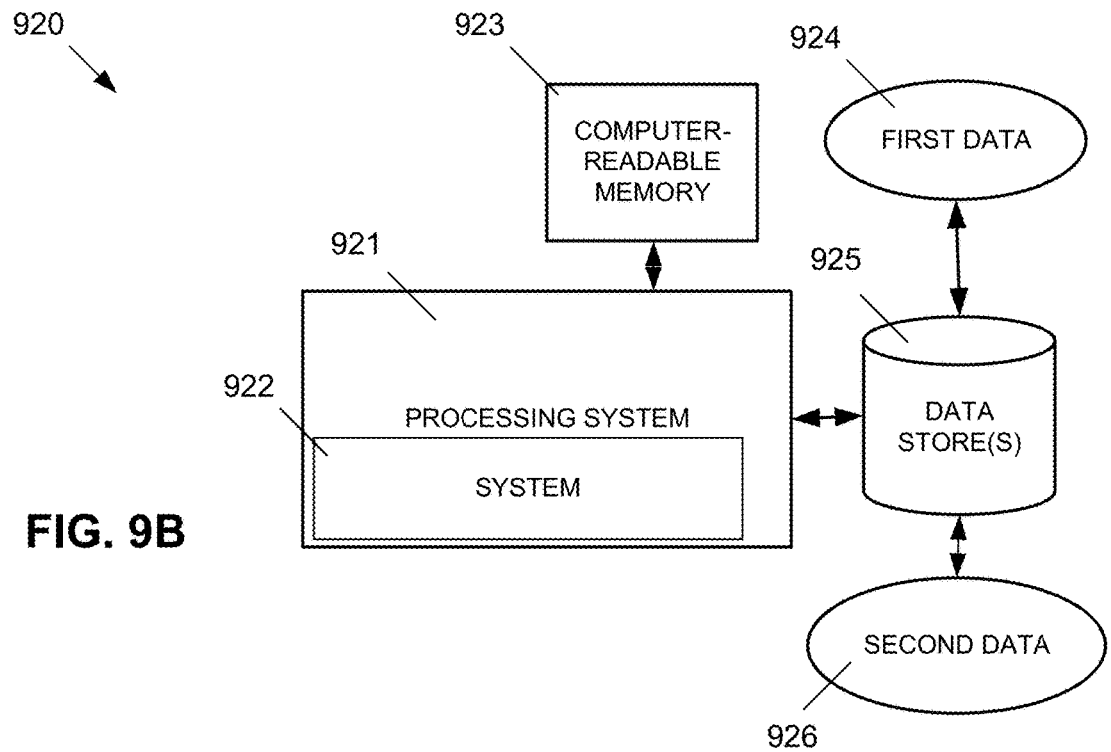
Figure 9C:
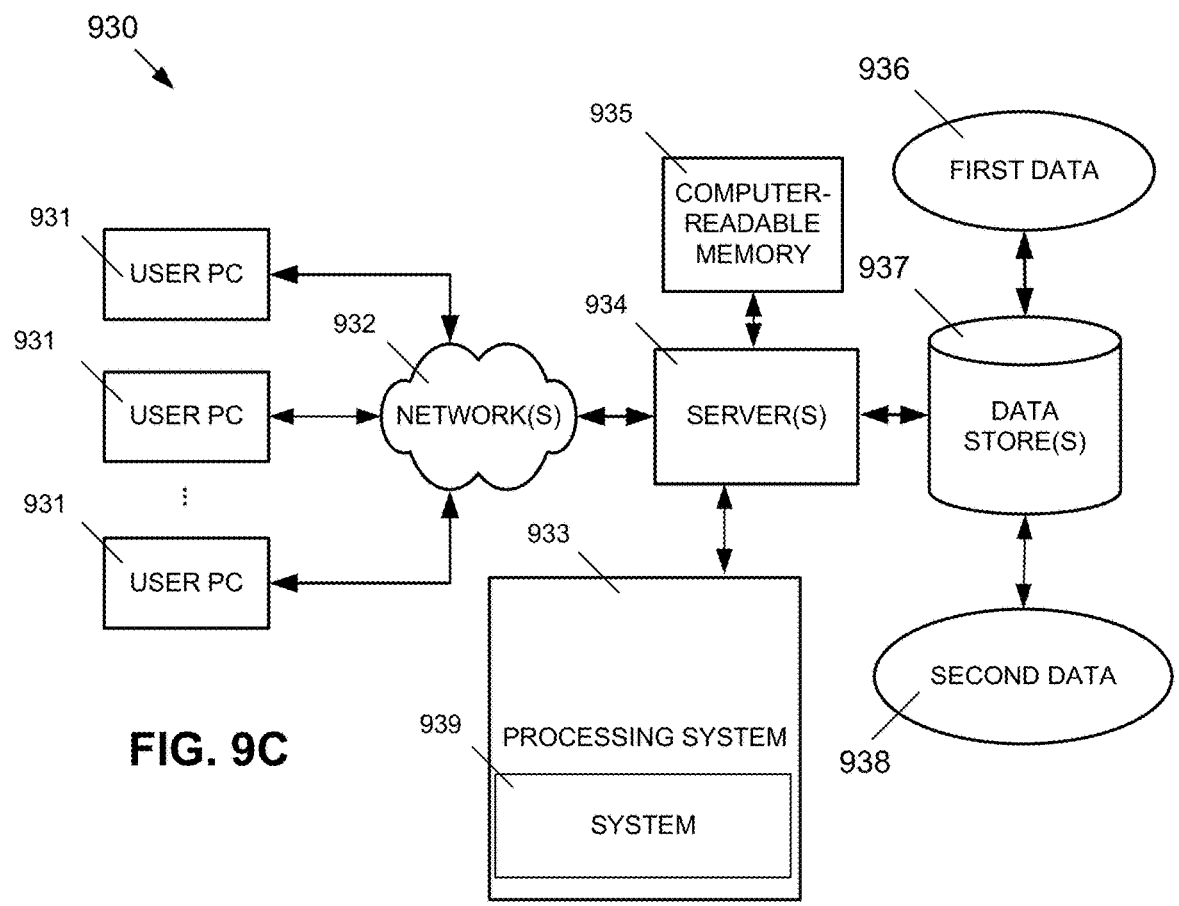
Figure 9D:
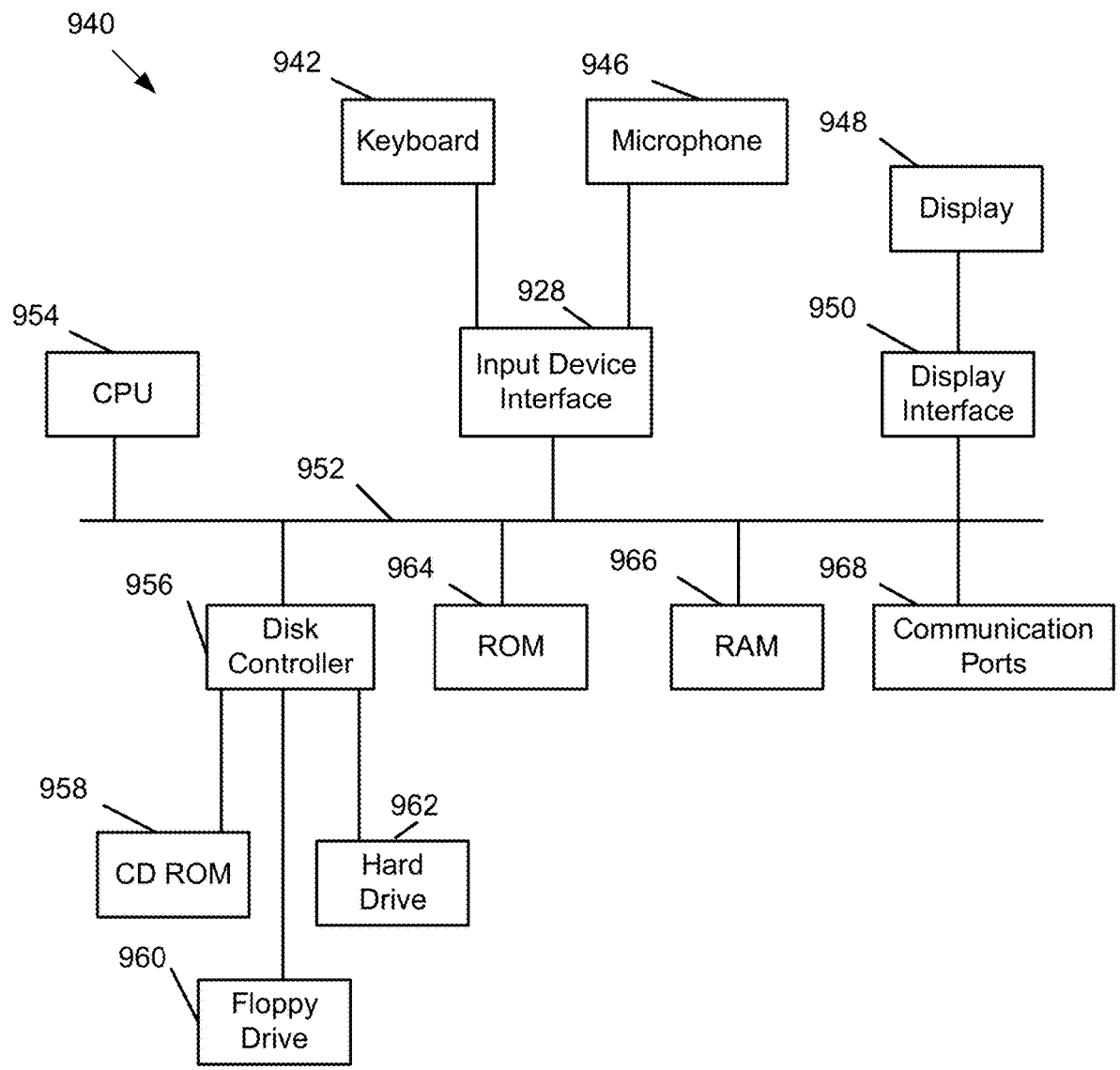

FIGS. 9B, 9C, and 9D depict example systems for use in implementing a system. For example, FIG. 9B depicts an exemplary system 920 that includes a standalone computer architecture where a processing system 921 (e.g., one or more computer processors) includes a system 922 being executed on it. The processing system 921 has access to a non-transitory computer-readable memory 923 in addition to one or more data stores 925. The one or more data stores 925 may contain first data 924 as well as second data 926.

FIG. 9C depicts a system 930 that includes a client server architecture. One or more user PCs 931 accesses one or more servers 934 running a system 939 on a processing system 933 via one or more networks 932. The one or more servers 934 may access a non-transitory computer readable memory 935 as well as one or more data stores 937. The one or more data stores 937 may contain first data 936 as well as second data 938.

FIG. 9D shows a block diagram of exemplary hardware for a standalone computer architecture 940, such as the architecture depicted in FIG. 9B, that may be used to contain and/or implement the program instructions of system embodiments of the present invention. A bus 952 may serve as the information highway interconnecting the other illustrated components of the hardware. A processing system 954 labeled CPU (central processing unit) (e.g., one or more computer processors), may perform calculations and logic operations required to execute a program. A non-transitory computer-readable storage medium, such as read only memory (ROM) 564 and random access memory (RAM) 566, may be in communication with the processing system 554 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 956 interfaces one or more optional disk drives to the system bus 952. These disk drives may be external or internal floppy disk drives such as 960, external or internal CD-ROM, CD-R, CD-RW or DVD drives such as 958, or external or internal hard drives 962. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 956, the ROM 964 and/or the RAM 966. Preferably, the processor 954 may access each component as required.

A display interface 950 may permit information from the bus 952 to be displayed on a display 948 in audio, graphic, or alphanumeric format. Communication with external devices may optionally occur using various communication ports 968.

In addition to the standard computer-type components, the hardware may also include data input devices, such as a keyboard 942, or other input device, such as a microphone 946.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for conducting a simulated conversation with a language learner, the method comprising:
   determining, by one or more data processors, a first dialog state of the simulated conversation;
   transmitting, by the one or more data processors, first audio data corresponding to simulated speech based on the first dialog state;
   receiving, by the one or more data processors, second audio data corresponding to a variable length utterance spoken in response to the simulated speech, metrics associated with the variable length utterance being stored in a variable length data structure whose length is based on a length of the variable length utterance;
   generating, by the one or more data processors, a fixed dimension vector based on the variable length utterance, a length of the fixed dimension vector being fixed regardless of the length of the variable length utterance, the fixed dimension vector being generated by a factor analysis that samples a t-th frame of the variable length utterance from a distribution $$x_t \sim \Sigma_j \gamma_{jt} N(m_j + T_j V, \Sigma_j)$$

where $x_t$ represents the variable length utterance, $m_j$ represents a mean, $\Sigma_j$ represents a covariance of a j-th Gaussian component, $\gamma_{jt}$ represents a statistical alignment result of the frame t, $T_j$ represents a total variability, N is a constant, and V represents an utterance-specific standard normal distributed latent vector obtained by maximum a posterior (MAP) estimation;
   predicting, by the one or more data processors, a semantic label for the variable-length utterance based on the fixed dimension vector using both of (i) a recurrent neural network (RNN) in which an output of the factor analysis is an input layer to the RNN and an output layer of the RNN is a softmax layer with N one-hot vectors that each represent a different one of N dialog states that does not use automated speech recognition (ASR); and (ii) a convolutional neural network using ASR output as an input;
   determining, by one or more data processors, a second dialog state of the simulated conversation based on the semantic label; and
   transmitting, by the one or more data processors, third audio data corresponding to simulated speech based on the second dialog state.

2. The computer-implemented method of claim 1, wherein the fixed dimension vector is generated further based on a recurrent neural network (RNN)-based acoustic auto-encoder.

3. The computer-implemented method of claim 1, wherein the factor analysis uses multi-dimensional Mel-frequency cepstral coefficients (MFCCs) and first and second derivatives of the MFCCs.

4. The computer-implemented method of claim 1, wherein the semantic label is based on the first dialog state and comprises one of M semantic classes for the first dialog state.

5. The computer-implemented method of claim 1, wherein the simulated conversation corresponds to multi-task learning, wherein training data is shared among each task in a neural network.

6. The computer-implemented method of claim 1, wherein the language learner is a non-native English speaker.

7. The computer-implemented method of claim 1, wherein the third audio is transmitted across a computer network for playing through a speaker.

8. A computer-implemented system for conducting a simulated conversation with a language learner, the system comprising:
   one or more data processors;
   a non-transitory computer-readable medium encoded with instructions for commanding the one or more data processors to execute steps of a process that include:
      determining, by one or more data processors, a first dialog state of the simulated conversation;
      transmitting, by the one or more data processors, first audio data corresponding to simulated speech based on the first dialog state;

receiving, by the one or more data processors, second audio data corresponding to a variable length utterance spoken in response to the simulated speech, metrics associated with the variable length utterance being stored in a variable length data structure whose length is based on a length of the variable length utterance;

generating, by the one or more data processors, a fixed dimension vector based on the variable length utterance, a length of the fixed dimension vector being fixed regardless of the length of the variable length utterance, the fixed dimension vector being generated by a factor analysis that samples a t-th frame of the variable length utterance from a distribution $$x_t \sim \Sigma_j \gamma_{jt} N(m_j + T_j V, \Sigma_j)$$

where $x_t$ represents the variable length utterance, $m_j$ represents a mean, $\Sigma_j$ represents a covariance of a j-th Gaussian component, $\gamma_{jt}$ represents a statistical alignment result of the frame t, $T_j$ represents a total variability, N is a constant, and $V$ represents an utterance-specific standard normal distributed latent vector obtained by maximum a posterior (MAP) estimation;

predicting, by the one or more data processors, a semantic label for the variable-length utterance based on the fixed dimension vector using both of (i) a recurrent neural network (RNN) in which an output of the factor analysis is an input layer to the RNN and an output layer of the RNN is a softmax layer with N one-hot vectors that each represent a different one of N dialog states that does not use automated speech recognition (ASR); and (ii) a convolutional neural network using ASR output as an input;

determining, by one or more data processors, a second dialog state of the simulated conversation based on the semantic label; and transmitting, by the one or more data processors, third audio data corresponding to simulated speech based on the second dialog state.

9. The computer-implemented system of claim 8, wherein the fixed dimension vector is generated further based on a recurrent neural network (RNN)-based acoustic auto-encoder.

10. The computer-implemented system of claim 8, wherein the factor analysis uses multi-dimensional Mel-frequency cepstral coefficients (MFCCs) and first and second derivatives of the MFCCs.

11. The computer-implemented system of claim 8, wherein the semantic label is based on the first dialog state and comprises one of M semantic classes for the first dialog state.

12. The computer-implemented system of claim 8, wherein the simulated conversation corresponds to multi-task learning, wherein training data is shared among each task in a neural network.

13. The computer-implemented system of claim 8, wherein the language learner is a non-native English speaker.

14. A non-transitory computer-readable medium encoded with instructions for commanding one or more data processors to execute steps of a method for conducting a simulated conversation with a language learner, the method comprising:

determining, by one or more data processors, a first dialog state of the simulated conversation;

transmitting, by the one or more data processors, first audio data corresponding to simulated speech based on the first dialog state;

receiving, by the one or more data processors, second audio data corresponding to a variable length utterance spoken in response to the simulated speech, metrics associated with the variable length utterance being stored in a variable length data structure whose length is based on a length of the variable length utterance;

generating, by the one or more data processors, a fixed dimension vector based on the variable length utterance, a length of the fixed dimension vector being fixed regardless of the length of the variable length utterance, the fixed dimension vector being generated by a factor analysis that samples a t-th frame of the variable length utterance from a distribution $$x_t \sim \Sigma_j \gamma_{jt} N(m_j + T_j V, \Sigma_j)$$

where $x_t$ represents the variable length utterance, $m_j$ represents a mean, $\Sigma_j$ represents a covariance of a j-th Gaussian component, $\gamma_{jt}$ represents a statistical alignment result of the frame t, $T_j$ represents a total variability, N is a constant, and $V$ represents an utterance-specific standard normal distributed latent vector obtained by maximum a posterior (MAP) estimation;

predicting, by the one or more data processors, a semantic label for the variable-length utterance based on the fixed dimension vector using both of (i) a RNN decoder in which an output of the factor analysis is an input layer to the RNN decoder and an output layer of the RNN decoder is a softmax layer with N one-hot vectors that each represent a different one of N dialog states that does not use automated speech recognition (ASR); and (ii) a convolutional neural network using ASR output as an input;

determining, by one or more data processors, a second dialog state of the simulated conversation based on the semantic label; and transmitting, by the one or more data processors, third audio data corresponding to simulated speech based on the second dialog state.

* * * * *